(12) United States Patent
Bindra et al.

(10) Patent No.: US 9,475,023 B2
(45) Date of Patent: Oct. 25, 2016

(54) OPTIMUM PROCESS DESIGN OF PACKED BED TYPE THERMAL STORAGE SYSTEMS AND OTHER APPLICATIONS

(75) Inventors: Hitesh Bindra, Fort Lee, NJ (US); Pablo Bueno, New York, NY (US)

(73) Assignee: The Research Foundation of the City University of New York, New York, NY (US)

( * ) Notice: Subject to any disclaimer, the term of this patent is extended or adjusted under 35 U.S.C. 154(b) by 306 days.

(21) Appl. No.: 14/234,286

(22) PCT Filed: Jan. 10, 2012

(86) PCT No.: PCT/US2012/020770
§ 371 (c)(1),
(2), (4) Date: Jun. 23, 2014

(87) PCT Pub. No.: WO2013/015834
PCT Pub. Date: Jan. 31, 2013

(65) Prior Publication Data
US 2014/0299306 A1      Oct. 9, 2014

Related U.S. Application Data

(60) Provisional application No. 61/512,281, filed on Jul. 27, 2011.

(51) Int. Cl.
| | |
|---|---|
| *B01D 53/04* | (2006.01) |
| *F28D 17/02* | (2006.01) |
| *F28D 20/00* | (2006.01) |
| *B01J 19/00* | (2006.01) |

(Continued)

(52) U.S. Cl.
CPC ............ *B01J 19/0006* (2013.01); *B01D 53/04* (2013.01); *F01K 23/10* (2013.01); *F22B 1/028* (2013.01); *F28D 17/02* (2013.01); *F28D 20/00* (2013.01); *F28D 20/0056* (2013.01); *F28D 2020/0069* (2013.01); *Y02E 20/16* (2013.01); *Y02E 60/142* (2013.01)

(58) Field of Classification Search
CPC .. B01D 53/02; B01D 53/04; B01D 53/0423; F28D 17/00; F28D 17/02; F28D 20/00
USPC .......... 95/1, 8, 14, 16, 90, 141; 96/108, 109, 96/111, 112, 121, 417, 420; 165/200; 60/643, 659
See application file for complete search history.

(56) References Cited

U.S. PATENT DOCUMENTS 4,018,419 A     4/1977  Monpetit
4,291,750 A  *  9/1981  Clyne .................... F28D 20/02
                                                              126/641

(Continued)

OTHER PUBLICATIONS

International Search Report dated May 3, 2012 for International Application No. PCT/US12/20770.

(Continued)

*Primary Examiner* — Robert A Hopkins
(74) *Attorney, Agent, or Firm* — Burns & Levinson LLP; Orlando Lopez

(57) ABSTRACT

Methods and systems for optimizing the process of heat and/or mass transfer operations in packed beds and embodiments of applications of the methods are disclosed herein below. In one instance, the method results in the profile of the quantity representative of the heat and/or mass transfer operation having a propagating substantially sharp front.

34 Claims, 16 Drawing Sheets

(51) Int. Cl.
  *F01K 23/10* (2006.01)
  *F22B 1/02* (2006.01)

(56) References Cited

U.S. PATENT DOCUMENTS 4,430,161 A   2/1984  Petrovic et al.
7,708,963 B2  5/2010  Schedler et al.
7,954,321 B2 * 6/2011  Shinnar ................ F03G 6/04
                                              165/902

OTHER PUBLICATIONS

Crandall, D.M. et al. Segmented thermal storage. Solar Energy 77 (2004) 435-440.

* cited by examiner

OPTIMUM PROCESS DESIGN OF PACKED BED TYPE THERMAL STORAGE SYSTEMS AND OTHER APPLICATIONS

CROSS REFERENCE TO RELATED APPLICATIONS

This application is a U.S. national stage application under 35 U.S.C. 371 of co-pending International Application No, PCT/US12/20770 filed on Jan. 10, 2012 and entitled OPTIMUM PROCESS DESIGN OF PACKED BED TYPE THERMAL STORAGE SYSTEMS AND OTHER. APPLICATIONS, which in turn claims priority to U.S. Provisional Patent Application No. 61/512,281 filed on Jul. 27, 2011, which is incorporated by reference herein in its entirety for all purposes.

STATEMENT REGARDING FEDERALLY SPONSORED RESEARCH OR DEVELOPMENT

This invention was made partially with U.S. Government support from the U.S. Department of Energy under Grant Number EERE 0018151, The U.S. Government has certain rights in the invention.

BACKGROUND

Packed beds have been utilized for various heat and mass transfer operations, e.g. adsorption, thermal storage, chromatography etc. The performance of packed beds in most of these systems is analyzed using concentration or temperature profile in the bed and their progression in time. It is desirable, in many systems, to have a profile which progresses in the form of sharp front. For such a profile, the space or material utilization is maximum and recovery is very efficient. However, many difficulties are encountered in real life to achieve such sharp front. In thermal or heat storage processes, having a profile with a sharp front becomes even more important due to exergetic efficiency. Shinnar has described certain ways to achieve this sharpness for thermal wave front. However, many systems, it is not feasible to obtain a sharp front. The relative steepness of the front can be increased by increasing the length of the bed traversed or connecting many such beds in series. But this method will largely increase the pressure drop incurred which will increase the operating costs, particularly for the case of gases as the carrier medium.

In any mass transfer or heat transfer operation involving surface or bulk absorption over packed beds, there is always an optimization between pressure drops incurred and transfer effectiveness. This optimization becomes significantly important if the fluids involved are gases as it is more expensive to compress gases. The adsorption, ion-exchange or absorption phenomena in packed bed are dependent upon on several factors such as fluid flow rates, mass transfer coefficient, packing shape and size, porosity etc. The effectiveness of the transport process over the bed is evaluated by the concentration profile of the solute. These concentration profiles, also known as breakthrough curves, determine the effectiveness by the steepness of concentration gradient spread over the bed. Higher steepness makes the system more effective and thus economically feasible. The additional savings for this system is reduction in compression costs considerably.

FIG. 1 depicts a moving adsorption front with constant thickness. Additional length of the bed represents higher fractional utilization. FIG. 1 exemplifies the progression of solute concentration front and illustrates that in order to completely saturate the original bed length it is necessary to introduce additional length (20% extra). The extra bed length implies additional pressure drop. Therefore, if fractional utilization is increased, compression costs increase as well. In case of very sharp fronts without any dispersion effects, such problems do not exist. However for not so sharp fronts and high pressure drop systems this design of a regular packed bed arrangement is not optimal. In fact for some applications such as flue gas treatment, higher pressure drops are not allowed so the overall fractional utilization is increased and systems become expensive.

There is a need for methods for optimizing the process of heat and mass transfer operations in packed beds. There is also a need for the application of those methods for optimizing the process.

BRIEF SUMMARY

Embodiments of methods for optimizing the process of heat and mass transfer operations in packed beds and embodiments of applications of the methods are disclosed herein below.

In one embodiment, the method of these teachings for optimizing utilization of packed beds in a heat/mass transfer operation includes (a) initially injecting fluid, the fluid being the used in a heat/mass transfer operation, into a first packed bed from N (a first number) packed beds (the first packed bed is an instance of an input packed bed), a sensor being disposed between each consecutive one of the packed beds, exit of the fluid is enabled M (a second number) packed beds away from the input packed bed and along a flow path including the input packed bed, a packed bed M of packed beds away from the input packed bed being an output packed bed, (b) sensing, utilizing the sensor between the input packed bed and a consecutive packed bed, a quantity representative of the heat/mass transfer operation, (c) transferring, if output of the sensor disposed between the input packed bed and a next packed bed exceeds a predetermined sensor output, injection of fluid from the input packed bed to a next packed bed in the flow path, referred to as a successor packed bed, and the exit of fluid from the output packed bed to a packed bed succeeding the output packed bed and next to the output packed bed, referred to as a follower packed bed; wherein the follower packed bed was not previously in the flow path, the successor packed bed becoming the input packed bed and the follower packed bed becoming the output packed bed, and (d) repeating steps (b) and (c) until the output packed bed is a last packed bed from the N packed beds.

In one embodiment, the system of these teachings for optimizing utilization of packed beds in a heat/mass transfer operation includes a first number of packed beds, a number of flow connection/control components, one flow connection/control component disposed between two consecutive packed beds such that, when flow occurs, each packed bed in the flow path is connected in series to a successive packed bed in the flow path, a number of sensors, each sensor connected in series between one packed bed and a successive packed bed, and a control subsystem transferring, if output of the sensor disposed between an input packed bed and a next packed bed exceeds a predetermined sensor output, injection of fluid from the input packed bed to a next packed bed in the flow path (referred to as a successor packed bed), and the exit of fluid from an output packed bed to a packed bed succeeding the output packed bed and next to the output packed bed (referred to as a follower packed bed), wherein the follower packed bed was not previously in the flow path, the successor packed bed becoming the input packed bed and the follower packed bed becoming the output packed bed. The control subsystem is operatively connected to the sensors and to the flow connection/control components. The flow connection/control components enable initially injecting fluid, the fluid being the used in a heat/mass transfer operation, into a first packed bed, the first packed bed being initially the input packed bed, and exit of the fluid from a packed bed M packed beds away from and along the flow path including the input packed bed. The packed bed M packed beds away from the input packed bed is the output packed bed.

For a better understanding of the present teachings, together with other and further objects thereof, reference is made to the accompanying drawings and detailed description and its scope will be pointed out in the appended claims.

DETAILED DESCRIPTION

Figure 1:
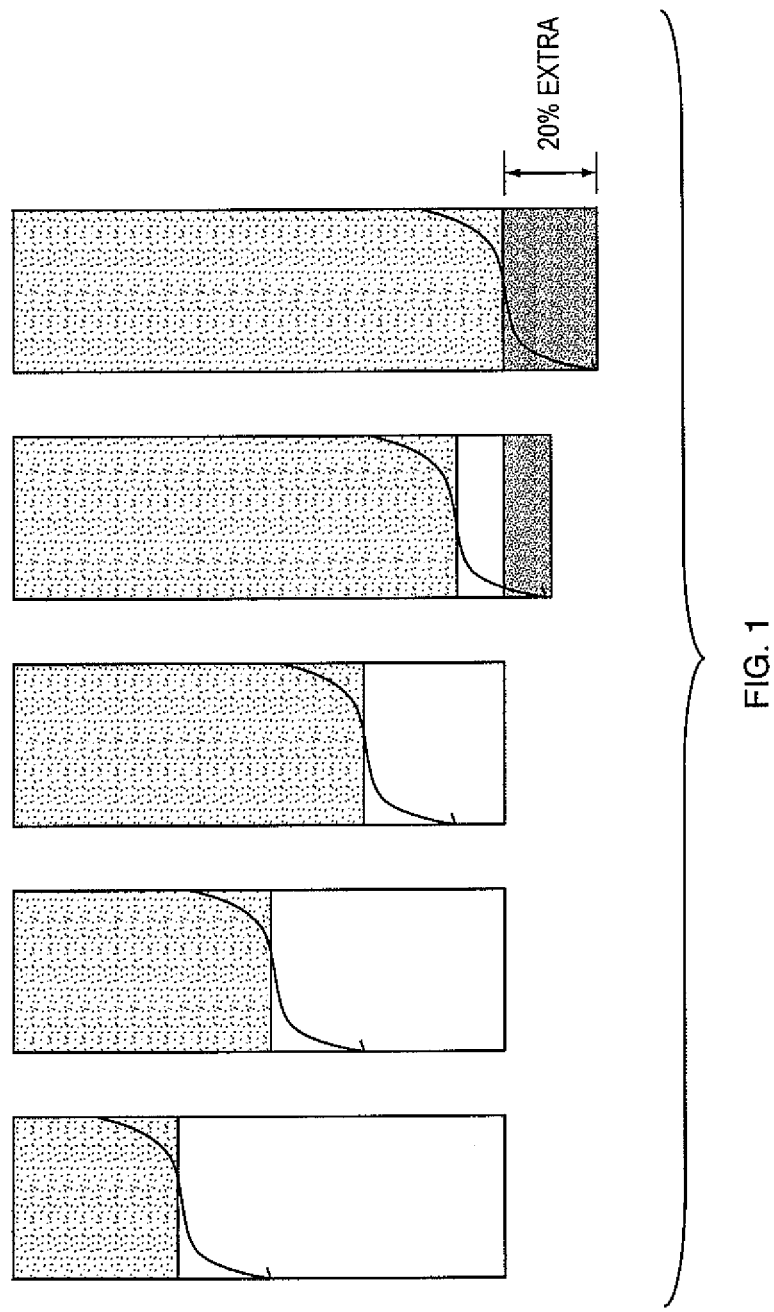
FIG. 1 is a graphical schematic representation of a moving adsorption front in a conventional packed bed.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range. However, any ranges not cited in the claims are only intended for illustration and not for limiting the range covered by our invention. Numerical values are cited for exemplary reasons and to identify embodiments and are not intended to limit the general concept of these teachings.

As used herein, "Biot number" refers to a ratio of the product of the heat transfer coefficient and a characteristic length, typically defined as the volume of the body divided by the surface area of the body, to the thermal conductivity of the body.

As used herein, a "signal actuation component" is a component that participates in sending a signal to a flow connection/control component, where the signal causes actuation or a change in behavior of the flow connection/control component.

Embodiments of methods for optimizing the process of heat and mass transfer operations in packed beds and embodiments of applications of the methods are disclosed herein below.

In one embodiment, the method of these teachings for optimizing utilization of packed beds in a heat/mass transfer operation includes (a) initially injecting fluid, the fluid being the used in a heat/mass transfer operation, into a first packed bed from N (a first number) packed beds (the first packed bed is an instance of an input packed bed), a sensor being disposed between each consecutive one of the packed beds, exit of the fluid is enabled M (a second number) packed beds away from the input packed bed and along a flow path including the input packed bed, a packed bed M of packed beds away from the input packed bed being an output packed bed, (b) sensing, utilizing the sensor between the input packed bed and a consecutive packed bed, a quantity representative of the heat/mass transfer operation, (c) transferring, if output of the sensor disposed between the input packed bed and a next packed bed exceeds a predetermined sensor output, injection of fluid from the input packed bed to a next packed bed in the flow path, referred to as a successor packed bed, and the exit of fluid from the output packed bed to a packed bed succeeding the output packed bed and next to the output packed bed, referred to as a follower packed bed, wherein the follower packed bed was not previously in the flow path, the successor packed bed becoming the input packed bed and the follower packed bed becoming the output packed bed, and (d) repeating steps (b) and (c) until the output packed bed is a last packed bed from the N packed beds. In the above disclosed embodiment, M and N are different from each other and, for each instantiation, M and N are determined integers.

In one embodiment, the system of these teachings for optimizing utilization of packed beds in a heat/mass transfer operation includes a first number of packed beds, a number of flow connection/control components, one flow connection/control component disposed between two consecutive packed beds such that, when flow occurs, each packed bed in the flow path is connected in series to a successive packed bed in the flow path, a number of sensors, each sensor connected in series between one packed bed and a successive packed bed, and a control subsystem transferring, if output of the sensor disposed between an input packed bed and a next packed bed exceeds a predetermined sensor output, injection of fluid from the input packed bed to a next packed bed in the flow path (referred to as a successor packed bed), and the exit of fluid from an output packed bed to a packed bed succeeding the output packed bed and next to the output packed bed (referred to as a follower packed bed), wherein the follower packed bed was not previously in the flow path, the successor packed bed becoming the input packed bed and the follower packed bed becoming the output packed bed. The control subsystem is operatively connected to the sensors and to the flow connection/control components. The flow connection/control components enable initially injecting fluid, the fluid being used in a heat/mass transfer operation, into a first packed bed, the first packed bed being initially the input packed bed, and exit of the fluid from a packed bed M packed beds away from and along the flow path including the input packed bed. The packed bed M packed beds away from the input packed bed is the output packed bed.

Hereinbelow, embodiments where M=1 are disclosed in order to better illustrate the present teachings. In that embodiment, the number of packed beds in the flow path is 2. It should be noted that these teachings are not only limited to that embodiment.

In one group of embodiments, the N packed beds constitute a thermal storage system and the sensor senses temperature. Thermal storage systems are utilized in a variety of energy related applications, such as combined cycle power plants and power generation by a variety of energy sources such as, solar, steam and nuclear energy. Examples of such thermal storage systems are given in such as the thermal storage systems disclosed in U.S. Pat. No. 7,954,321, issued on Jun. 7, 2011 to R. Shinnar, and in US Patent Application Publication 20090178409, "Apparatus And Method For Storing Heat Energy," published on Jul. 16, 2009, both of which are Incorporated by reference herein in their entirety for all purposes, and in WIPO PCT Patent Application Publication Number WO/2012/150969 corresponding to WIPO PCT Patent Application Number PCT/US12/20743, entitled "THERMAL ENERGY STORAGE FOR COMBINED CYCLE POWER PLANTS," filed concurrently with the present application, and claiming priority of U.S. Provisional Patent Application No. 61/481,312, filed on May 2, 2011, all of which are incorporated by reference herein in their entirety for all purposes.

Figure 2:
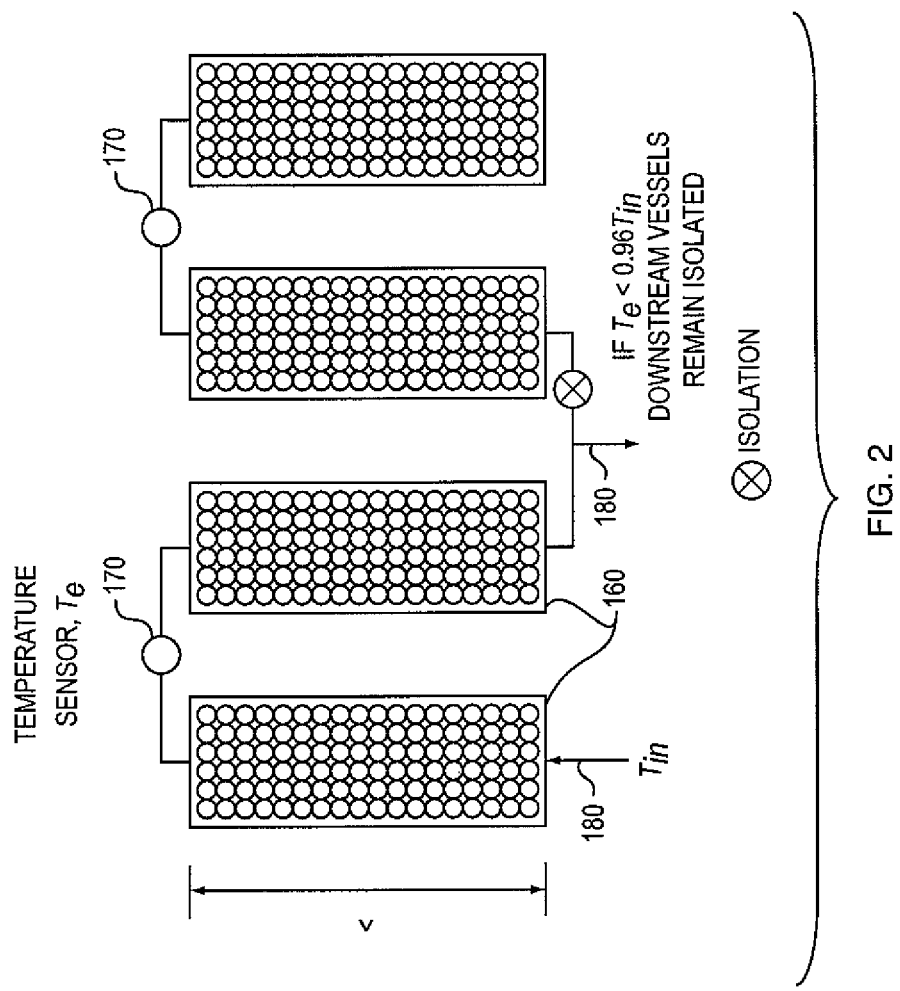
FIG. 2 depicts a schematic representation of an embodiment of a thermal storage system of these teachings.

FIG. 2 depicts an embodiment of a thermal storage system of these teachings utilizing four packed beds (N=4). Referring to FIG. 2, in the embodiment shown therein, four packed beds 160 (thermal storage packed beds in the embodiment shown therein) are connected in series and a sensor 170 (a temperature sensor in the embodiment shown therein) disposed between each consecutive one of the packed beds 160. The temperature sensor can be, for example, but not limited to, a thermocouple or thermistor or a noncontact sensor such as an infrared imager. A flow connection component 180 (such as one or more valves) is disposed between each two consecutive packed beds 160. In FIG. 2, one flow collection component 180 enables fluid input into the first packed bed and another flow connection component 180 enables fluid exit from the second packed bed. The flow connection/control component can be, for example, not a limitation of these teachings, one or more active valves, such as, for example, not a limitation of these teachings, a solenoid valve (a variety of other conventional active valves could also be used).

A control subsystem (205, FIG. 3a or FIG. 3b) is operatively connected to each sensor 170 and to each flow connection/control component 180. The control subsystem 205, if the output of the sensor disposed between an input packed bed and a next packed bed exceeds a predetermined sensor output, provides a signal to several flow connection components 180 and causes transfer of injection of fluid from the input packed bed to a next packed bed in the flow path, referred to as a successor packed bed, and the exit of fluid from an output packed bed to a packed bed succeeding the output packed bed and next to the output packed bed, referred to as a follower packed bed. The successor packed bed becomes the input packed bed and the follower packed bed becomes the output packed bed. In one instance, shown in FIG. 2, the predetermined sensor output is about 96% of the temperature of fluid injected into the input packed bed.

Figure 3A:
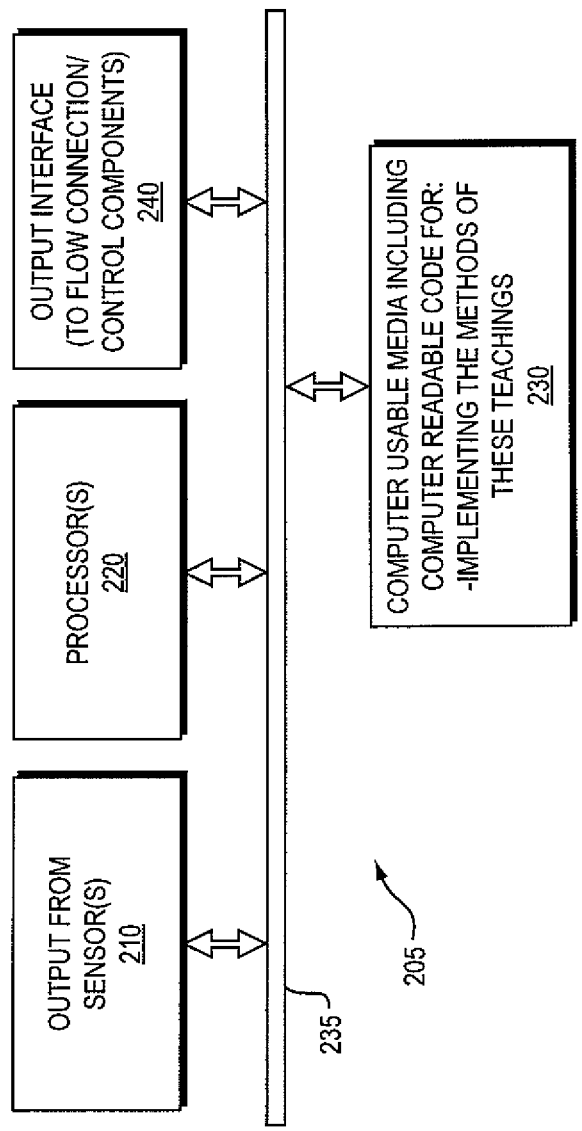
FIG. 3a is a schematic block diagram representation of an embodiment of the control subsystem of these teachings.

In one instance, a portion of the control subsystem 205 is located in proximity to and operatively connected to each sensor 170. In another instance, the control subsystem 205 is centralized and receives signals from each sensor 170. One embodiment of the control subsystem 205 is shown in FIG. 3a. Referring to FIG. 3a, the embodiment shown therein includes an input component 210 receiving the output from the sensors 170, one or more processors 220, one or more computer usable media 230 having computer readable code embodied therein, the computer readable code causing the one or more processors 220 to transfer, if output of the sensor disposed between an input packed bed and a next packed bed exceeds a predetermined sensor output, injection of fluid from the input packed bed to a next packed bed in the flow path, referred to as a successor packed bed, and the exit of fluid from an output packed bed to a packed bed succeeding the output packed bed and next to the output packed bed, referred to as a follower packed bed; wherein the follower packed bed was not previously in the flow path. An output interface 240 provide signals to the flow connection components 180 in order to execute the above disclosed transfer.

Figure 3B:
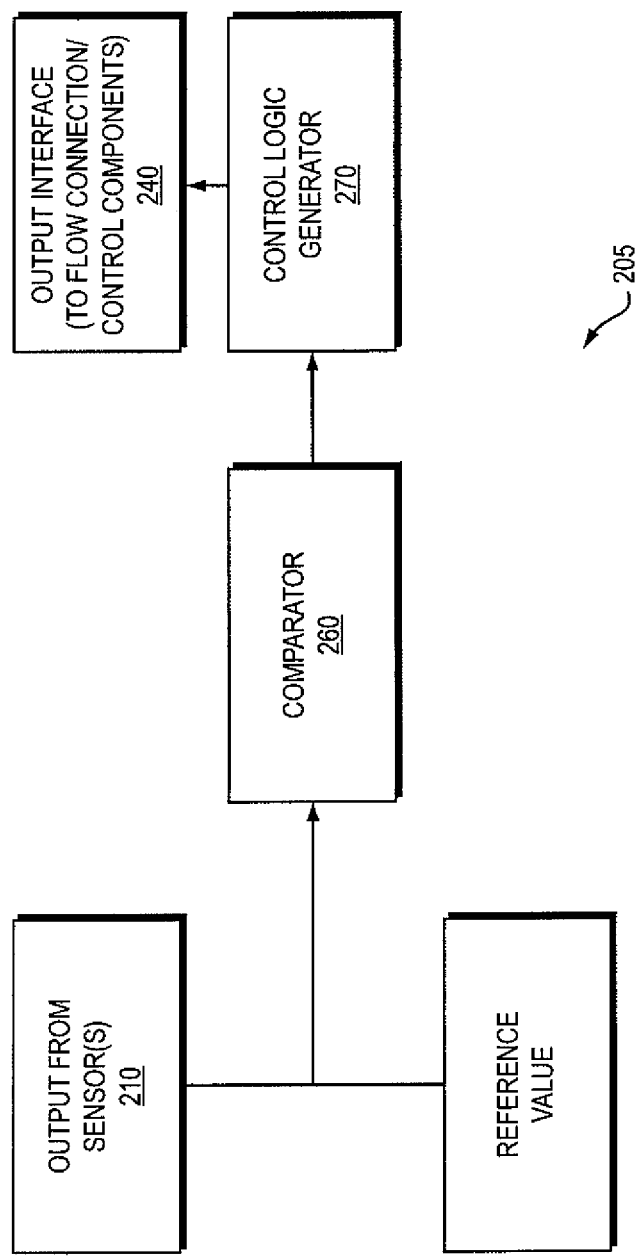
FIG. 3b is a schematic block diagram representation of another embodiment of the control subsystem of these teachings.

FIG. 3b shows another embodiment of the control subsystem 205 of these teachings. Referring to FIG. 3b, in the embodiment shown therein, output 210 from the sensor 170 disposed between an input packed bed and a next packed bed along the flow path is compared to a reference value by a comparator 260. The comparator 260 can be implemented using analog electronic design or digital electronic design. The output of the comparator 260 is provided to a control logic generator 270 (which could also be implemented using digital or analog electronics). The control logic generator 270 generates signals that are divided to flow connection components 180 in order to execute the above disclosed transfer. A digital version of the embodiment shown in FIG. 3b could be implemented in an FPGA.

Although the above described embodiments of the control subsystem use electronics, the final element should be mechanical such as gas dampers at the feed. In view of this, a number of mostly mechanical instantiations of the control subsystem are also within the scope of these teachings.

Figure 4A:
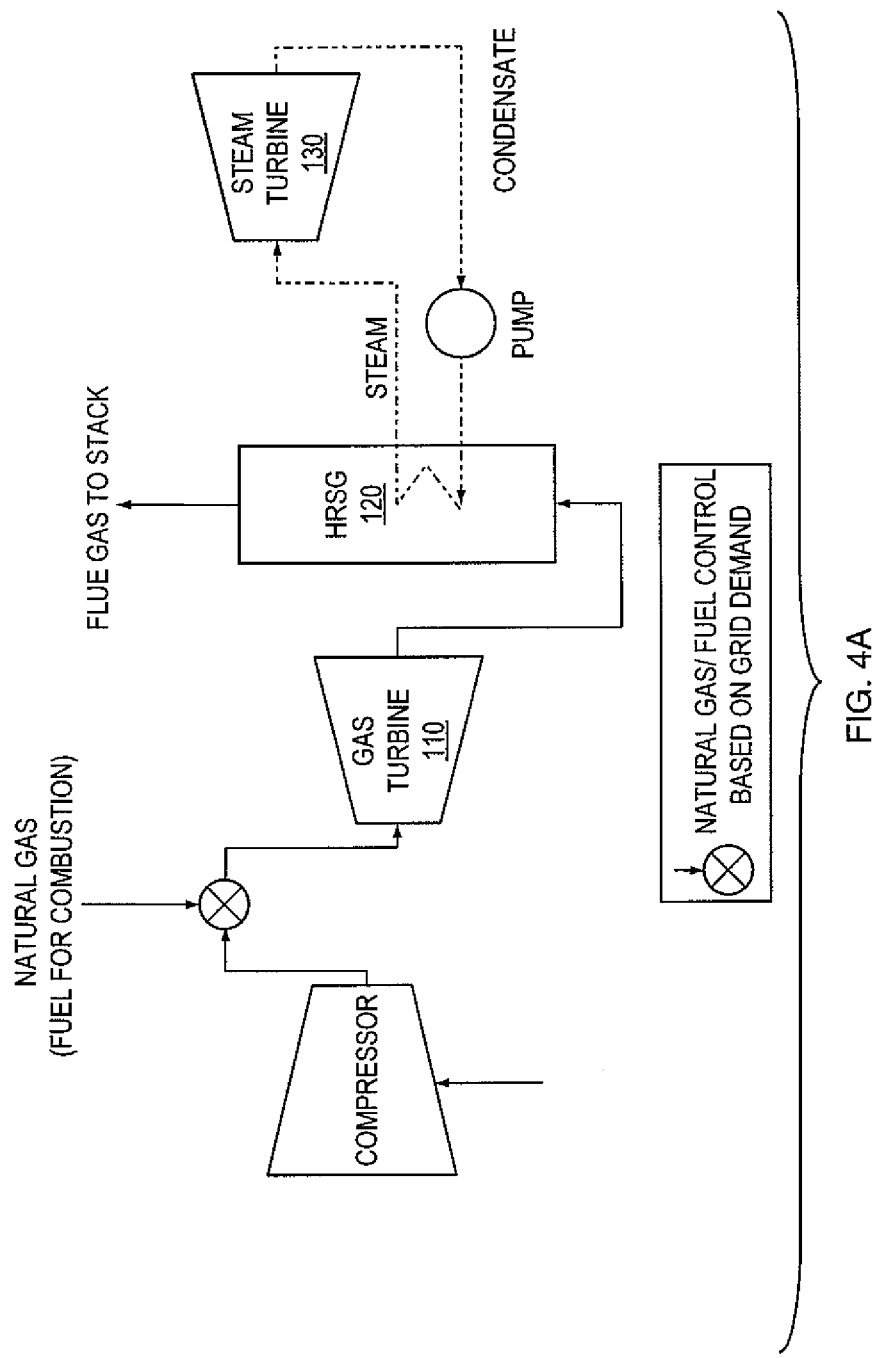
FIG. 4a is a schematic representation of a conventional combined cycle power plant.

In one instance, the method and system of these teachings for optimizing utilization of packed beds is utilized in a combined cycle power plant. Conventional combined cycle power plants CCPP) can be described by FIG. 4a. During normal operation, compressed air is introduced to a combustion chamber with natural gas or other fuel introduced in a controlled way. The high temperature (1100-1200° C.) gases which are produced as a result of this combustion are introduced to gas turbine 110. The exhaust gases after the expansion in the gas turbine 110 have much lower pressure (barely sufficient above atmospheric pressure in order to flow). The temperature of these exhaust gases is 550-600° C. resulting in the exhaust gases carrying high grade energy, which is recovered in a heat recovery steam generator (HRSG) 120 by generated steam in a separate cycle. The design of the HRSG 120 is such that the resultant back pressure to the gas turbine is very low (40-50 mBars). Therefore, providing the HRSG does not affect the efficiency of gas turbine and introduces capability of operating a steam Rankine cycle from the recovered heat. The efficiency of modern combined cycle power plants is almost 55-60%. The control of the power output from the plant is governed by the demand in the grid and is conntrolled via consumption of natural gas/fuel in the combustion chamber. This results in changed output from the gas turbine 110 and the steam turbine 130.

In conventional combined cycle power plants (CCPP), gas turbines operate continuously and the main control of electricity output is obtained by adjusting the main feed to the gas turbines. Combined cycle power plants (CCPP) also have a very low turndown ratio, but for natural gas they have a much higher efficiency (60% versus 37-45% for coal) than any other fossil based power plant and are therefore in use. CCPP technology is based on a high temperature gas turbine, the hot exhaust of which is fed to a boiler creating steam for a steam turbine. These plants provide a large fraction of the electric energy in the world and their use is growing fast (reaching over 20% of installed capacity in the U.S.). Since gas turbines have a very low turndown ratio, they can lose efficiency very rapidly when power is below maximum. The only control is basically on-off, as they can be shutdown in an hour and started up in one or two hours. But they are not suitable for rapid load following for grid regulation and there is not enough overcapacity to enable such operation as a practical matter.

In one embodiment, a method for efficient response to load variations in a combined cycle power plant, disclosed in WIPO PCT Patent Application Number PCT/US12/20743, entitled "THERMAL ENERGY STORAGE FOR COMBINED CYCLE POWER PLANTS," filed concurrently with the present application, and claiming priority of U.S. Provisional Patent Application No. 61/481,312, filed on May 2, 2011, includes providing, through a thermal storage tank, a flow path for fluid exiting a gas turbine, the flow path being enabled under predetermined conditions, placing in the flow path a storage medium having high thermal conductivity heat resistance particles, the particles being in contact with each other and defining voids between the particles in order to facilitate flow of in the fluid in a predetermined direction, the predetermined flow direction constituting a longitudinal direction, arrangement of the particles constituting a packed bed, dimensions of the particles and of the packed bed being selected in order to such that a resultant back pressure to the gas turbine is at most a predetermined back pressure. The method also includes efficiently responding to a decrease in load by enabling the flow path through the thermal storage tank and storage medium and providing at least a portion of the fluid exiting the gas turbine to the flow path.

Figure 4B:
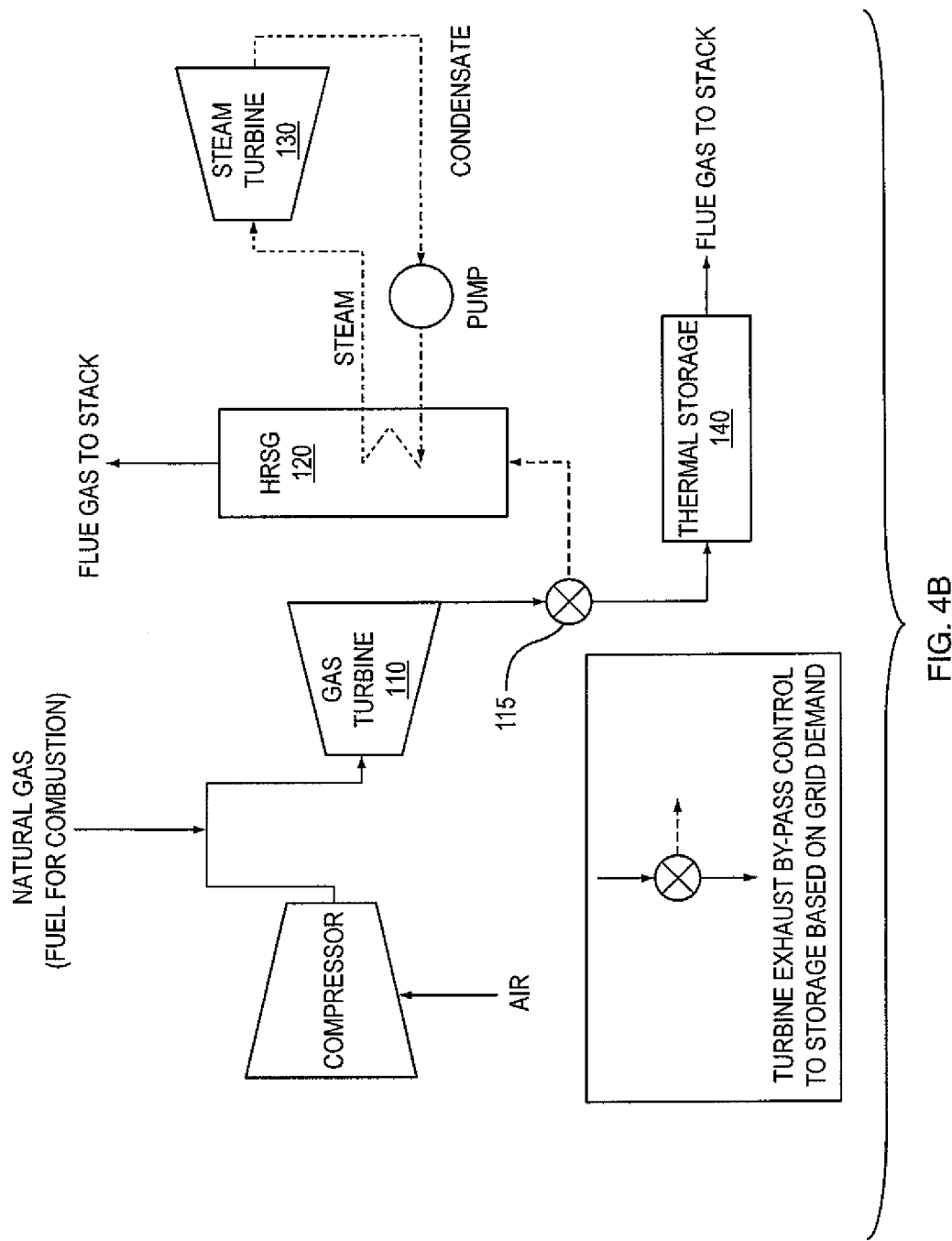
FIG. 4b is a schematic representation of a combined cycle power plant utilizing thermal storage.

FIG. 4b is a schematic diagram of a system for practicing the embodiment of the method disclosed in WIPO PCT Patent Application Number PCT/US12/20743, entitled "THERMAL ENERGY STORAGE FOR COMBINED CYCLE POWER PLANTS," filed concurrently with the present application, and claiming priority of U.S. Provisional Patent Application No. 61/481,312, filed on May 2, 2011. In one embodiment of the method, the efficiency of the gas turbine 110 is substantially maintained to the maximum level during all modes of grid demand operation. During load reduction times by the grid, the gas turbine power output is reduced as described hereinabove. The reduction in gas turbine power output is accompanied by major efficiency loss for the case of gas turbines when they are operated at lower power. In one embodiment of the method disclosed in WIPO PCT Patent Application Number PCT/US12/20743 (and corresponding publication), entitled "THERMAL ENERGY STORAGE FOR COMBINED CYCLE POWER PLANTS," filed concurrently with the present application, and claiming priority of U.S. Provisional Patent Application No. 61/481,312, filed on May 2, 2011, the gas turbine 110 is kept operating at substantially maximum power even during load reduction and the balance between supply and demand of power output is maintained by allowing the partial or complete flow of the exhaust gas through thermal storage modules 140. In this embodiment of that method, gas turbine efficiency is maintained to maximum level and power produced by steam turbine (efficiency substantially does not change with power level) is varied. The diverted exhaust gas, normally used to produce steam through the HRSG 120, has energy which is transferred to the storage modules 140. The storage modules 140 of these teachings preferably do not create substantially any additional back pressure or create minimal additional back pressure to the gas turbine 110. (In one exemplary instance, not a limitation of these teachings, pressure of the gae entering the HRSG 120 during gas turbine operation is about 0.5 atm gauge pressure. The operation of the storage volume 140 should occurr at substantially the same pressure.) In one embodiment, the method of these teachings for optimizing utilization of packed beds is applied to the thermal storage subsystem (the storage modules) 140. The storage modules 140 utilized in these teachings are designed in such a way to allow exhaust gas to be discharged back to the stack.

In one embodiment, the particles in the storage medium can be at least one of alumina, silica, quartz, or ceramic. In one instance, the dimensions and characteristics of the particles are selected such that Biot number magnitude does not exceed 0.1. In one embodiment of the storage medium of these teachings, alumina particles (e.g., stones or pebbles) are selected because the heat transfer resistance in a steam system is low. The latter means that the thermal conductivity of the alumina is high and their size is small so the time needed to reach the temperature of the hot fluid stream is very short compared to the fluid residence time, and the temperature of the alumina thus follows that of the surrounding hot fluid practically instantaneously.

The thermal storage system of these teachings differs from other thermal storage systems, such as the thermal storage systems disclosed in U.S. Pat. No. 7,954,321, issued on Jun. 7, 2011 to R. Shinnar, and in US Patent Application Publication 20090178409, "Apparatus And Method For Storing Heat Energy," published on Jul. 16, 2009, both of which are Incorporated by reference herein in their entirety for all purposes, in a variety of factors, among them being the requirement that storage modules of these teachings preferably do not create substantially any additional back pressure or create minimal additional back pressure.

Figure 5:
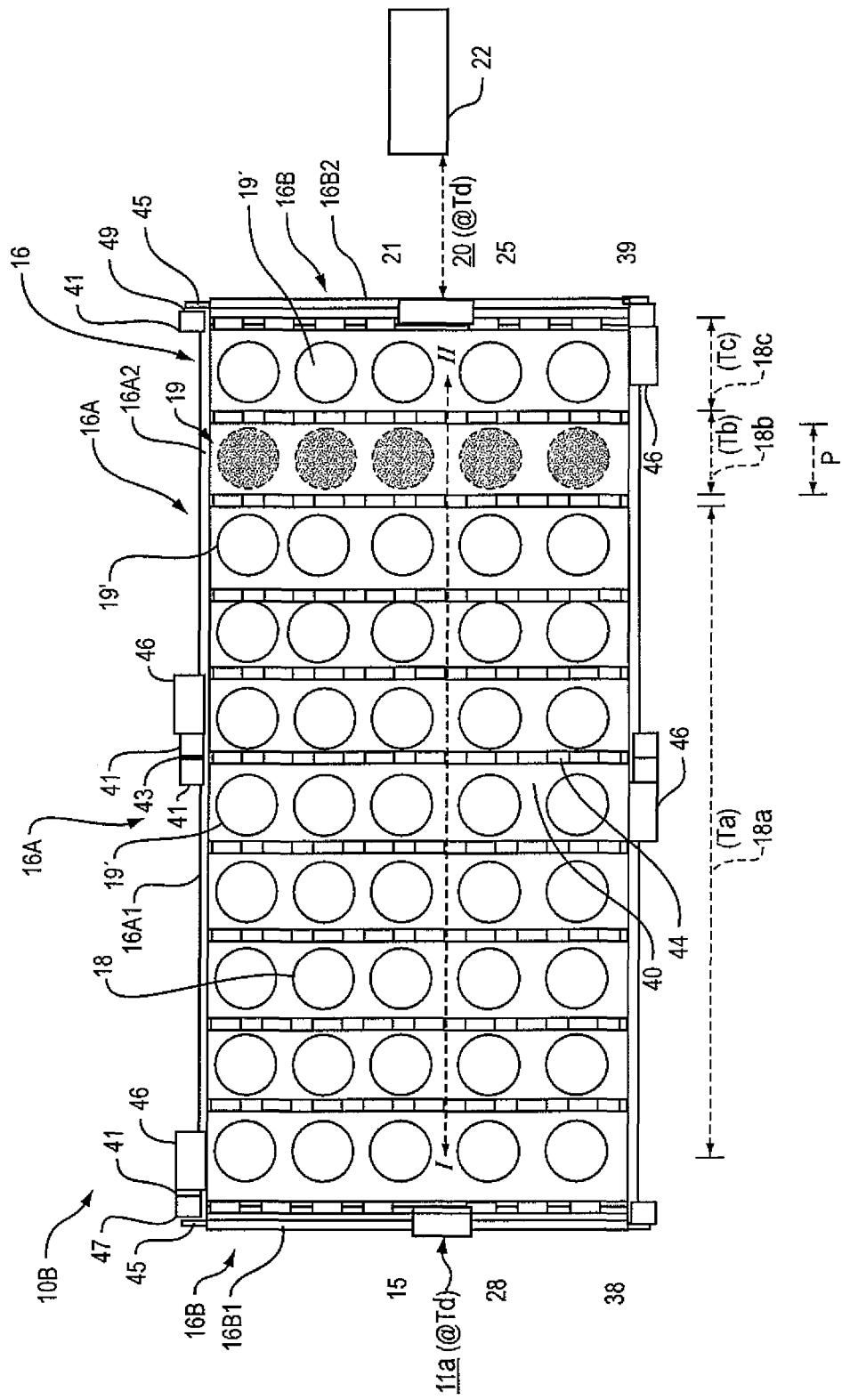
FIG. 5 is a cross-sectional view of a graphical representation of an embodiment of a heat storage subsystem of these teachings.

FIG. 5 shows the assembled modules in side cross-section with the packed (pebble) bed 19 loaded and filling the vessel interior from the vessel top to the vessel bottom, with flow path I-II extending through the medium 18 between the pebble material 19' of pebble bed 19. In one instance of these teachings, a single large storage vessel 16 can be used although smaller modules can be assembled to form the vessel. A single such module (in one instance, a 10-15 ft long section of pipe) is good for a small power plant, while a number of vessels can be assembled, in one instance, in parallel for a larger plant.

Referring again to FIG. 5, in an exemplary embodiment of these teachings, the storage vessel 16 includes preferably cylindrical modules 16A, with two modules 16A1 and 16A2 being vertically stacked and the closed vessel 16 being formed by addition of manifold plates 16B1 and 16B2 at the top 38 and bottom 39 respectively of vessel 16 on the respect outer ends of modules 16A1 and 16A2. Furthermore, Each module 16A is provided with a flange 41 at its top and bottom such that the mated modules can be and are sealed together at meeting adjacent flanges 41 to form seal 43, as indicated. A manifold plate 16B1 is placed at the top end of module 16A 1 such that manifold plate rim 45 cooperates with adjacent flange 41 to form seal 47 thereat and manifold plate 16B2 is placed at the bottom end of module 16A2 such that plate rim 45 cooperates with adjacent flange 41 to form seal 49, thus to provide a sealed storage container 16, as shown in FIG. 5. The cylindrical modules 16A, 16B of FIG. 5 preferably use sections of ready-made large diameter steel pipes such as those used for natural gas pipelines, each cut into a length that is easy to transport and to assemble (such as, in one instance, 5-7.5 ft long sections), and equipped with the flanges to assist assembly of the vessel on location. These modules 16A, 16B, etc., are preferably fitted with perforated plates 40 (FIG. 5), the holes 44 of which are smaller than the diameter of the storage material 19', to retain it in place. It will be appreciated that these plates can be, in one instance, made of non-conducting ceramic to minimize heat conduction through the storage material, since heat transfer is ideally restricted to direct contact between fluid 11a and pebble material 19'. It is desirable to limit conduction of heat particle to particle, and therefore in one practice of the invention we place an insulating step such as plates 40 at intervals, the plates having enough porosity to permit fluid flow and small enough to hold the particles in place.

In one exemplary embodiment, the ceramic filling material 19' is constructed by using small balls of non-porous alumina 3-10 mm in diameter (preferably 6-8 mm), with the desired outcome being a fast heating medium. The diameter of the non-porous alumina balls is selected such that the Biot number magnitude does not exceed 0.1.

The individual modules (each 5 ft high and 15 ft diameter) can be made of concrete with insulation lining or directly be made of insulation bricks. These sections should be designed for easy assembly on location. The short sections can be made and filled with the ceramic in a shop, and transported completely ready for final assembly. Concrete or brick walled modules can be made on-site based on economics associated.

In the combined cycle power plant system described hereinabove, the heat transfer fluid is a low pressure gas, just above atmospheric conditions, which means energy density of the fluid is much lower as compared to the fluids used in steam systems or pressurized solar system. Therefore, rate of energy deposition using the low pressure fluids is lower. Heat storage methods are efficient only when the heat loss rate to the environment is minimal as compared to the heat storage or recovery rate. With low pressure gas, it is not-desirable to have larger length to diameter columns as it would result in substantial drop in the temperature stored and recovered, i.e. more than 10%. In one instance, a ratio of a characteristic dimension of the packed bed in a longitudinal direction (such as, for example, height) to a characteristic dimension of the packed bed in a direction transverse to the longitudinal direction (such as, for example, diameter) is at most about 3.0, preferably 2.15. Preferably, the height of column is from about 10 ft to about 15 ft. Moreover, in applications in combined cycle power plants, it is essential to have very small back-pressure acting on the gas turbine. The smaller length of the storage vessel helps in reducing back pressure. The diameter of the bed is increased in order to have increased total volume, preferably to about 7 ft. Another design consideration in storage vessels is the size of alumina particles. If the size of particles used in the packed bed is increased, the pressure drop or resultant back pressure on the turbine is reduced. But particle size can be increased only up to the point where Biot number magnitude does not become greater than 0.1 in order for the temperature inside the particles to equilibrate. Preferably, the size range of alumina particles is about 6 mm two about 8 mm.

Figure 6:
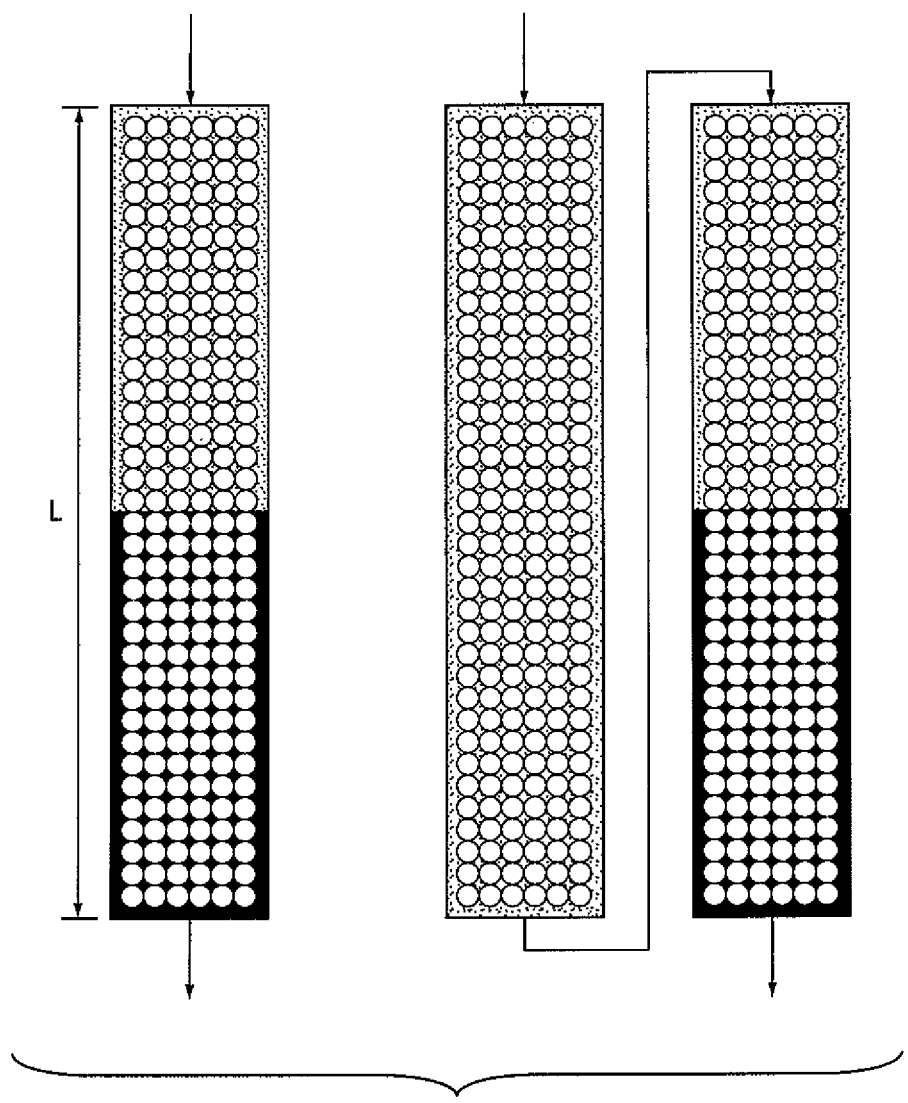
FIG. 6 is a schematic representation of storage used for combined cycle power plant applications.

In the method disclosed in WIPO PCT Patent Application Number PCT/US12/20743 (and corresponding publication), entitled "THERMAL ENERGY STORAGE FOR COMBINED CYCLE POWER PLANTS," filed concurrently with the present application, and claiming priority of U.S. Provisional Patent Application No. 61/481,312, filed on May 2, 2011, the storage method used for combined cycle power plant applications results in 50% utilizable or top temperature stored energy (shaded portion, FIG. 6). Employing two beds in series increases the utilization to 75%, as shown in FIG. 6, but also doubles pressure drop, which may not be desirable. The method of these teachings for optimizing utilization of packed beds can be applied, as shown in FIGS. 7a-7c, to the thermal storage system (storage modules) 160 in the combined cycle power plant shown in FIG. 4b.

Figure 7A:
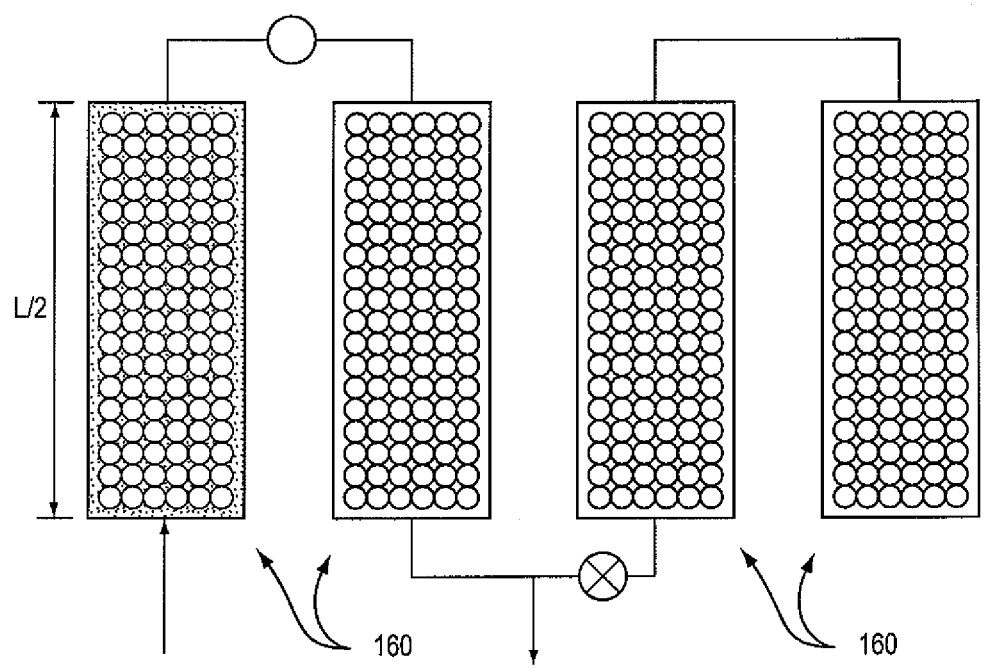
FIGS. 7a-7c are schematic representations of storage used for combined cycle power plant applications applying embodiments of these teachings.

Referring to FIG. 7a, a system with four packed beds (storage modules) 160 is shown therein. (It should be noted that the number of packed beds is not a limitation of these teachings.) When the fluid input is into the first packed bed and the fluid output is through the second packed bed, as shown in FIG. 7a, the utilization is similar to that in FIG. 6, and so is the pressure drop. When the temperature at the output of the first packed bed is substantially the same as the temperature of the input gas, as shown in FIG. 7b, the input is switched to the second packed bed and the fluid output is switched to the output of the third packed bed. The first packed bed is isolated. When the temperature at the output of the second packed bed is substantially the same as the temperature of the input gas, as shown in FIG. 7c, the input is switched to the third packed bed and the fluid output is switched to the output of the fourth packed bed. The second packed bed is isolated. (It should be noted that although the sensors, flow connection components and the control subsystem are not shown in FIGS. 7a-7c, those components are still present in the system.) Application of the method of these teachings, in the embodiment shown in FIGS. 7a-7c, to the combined cycle power system results in 75% packed bed utilization without an increase in pressure drop.

Figure 7B:
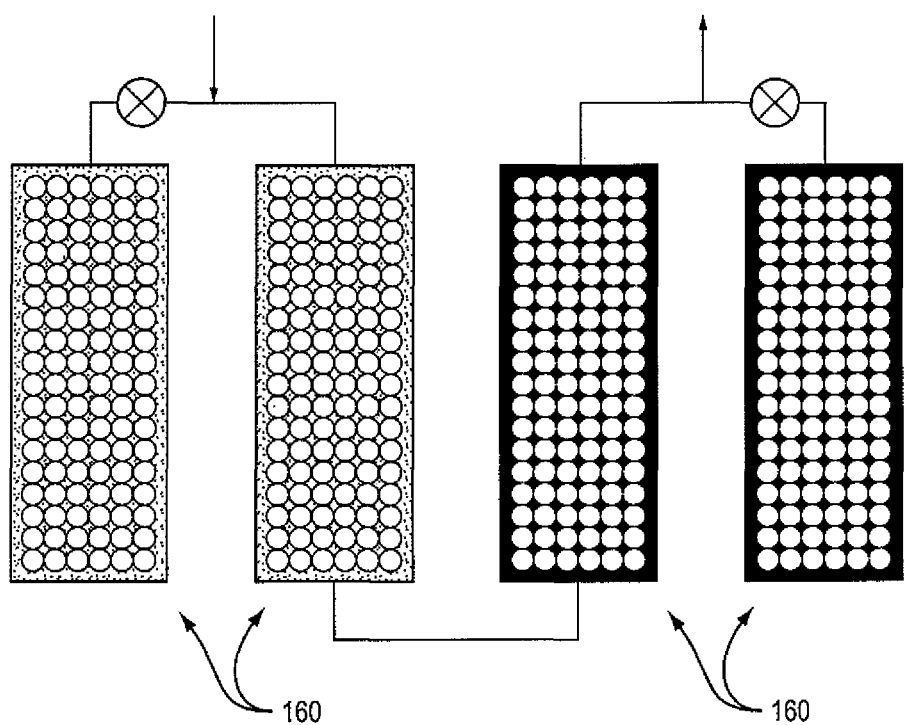
Figure 7C:
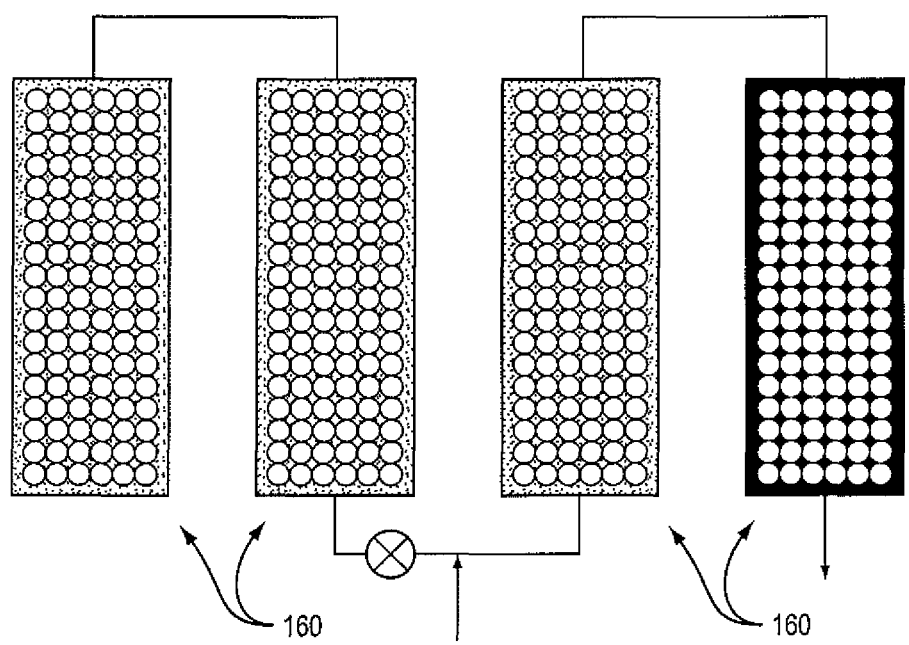

The packed beds (storage module) in FIGS. 7a-7c have a length equal to approximately ½ of the length of the packed bed in FIG. 6. Increasing the number of packed beds in series-parallel combination will keep on increasing the fractional utilization as follows:

For two (2) small (L/2) packed beds in series, the fractional utilization is approximately 50% (as shown in FIG. 5);

For 4 small (L/2) packed beds in series, the fractional utilization is approximately 75%;

For 5 small (L/2) packed beds in series, the fractional utilization is approximately 80%; and For 6 small (L/2) packed beds in series, the fractional utilization is approximately 83%.

Although the fractional utilization increases with the number of packed beds, the increase is not linear. The pressure drop is the same for each of the three configurations described hereinabove.

Figure 8:
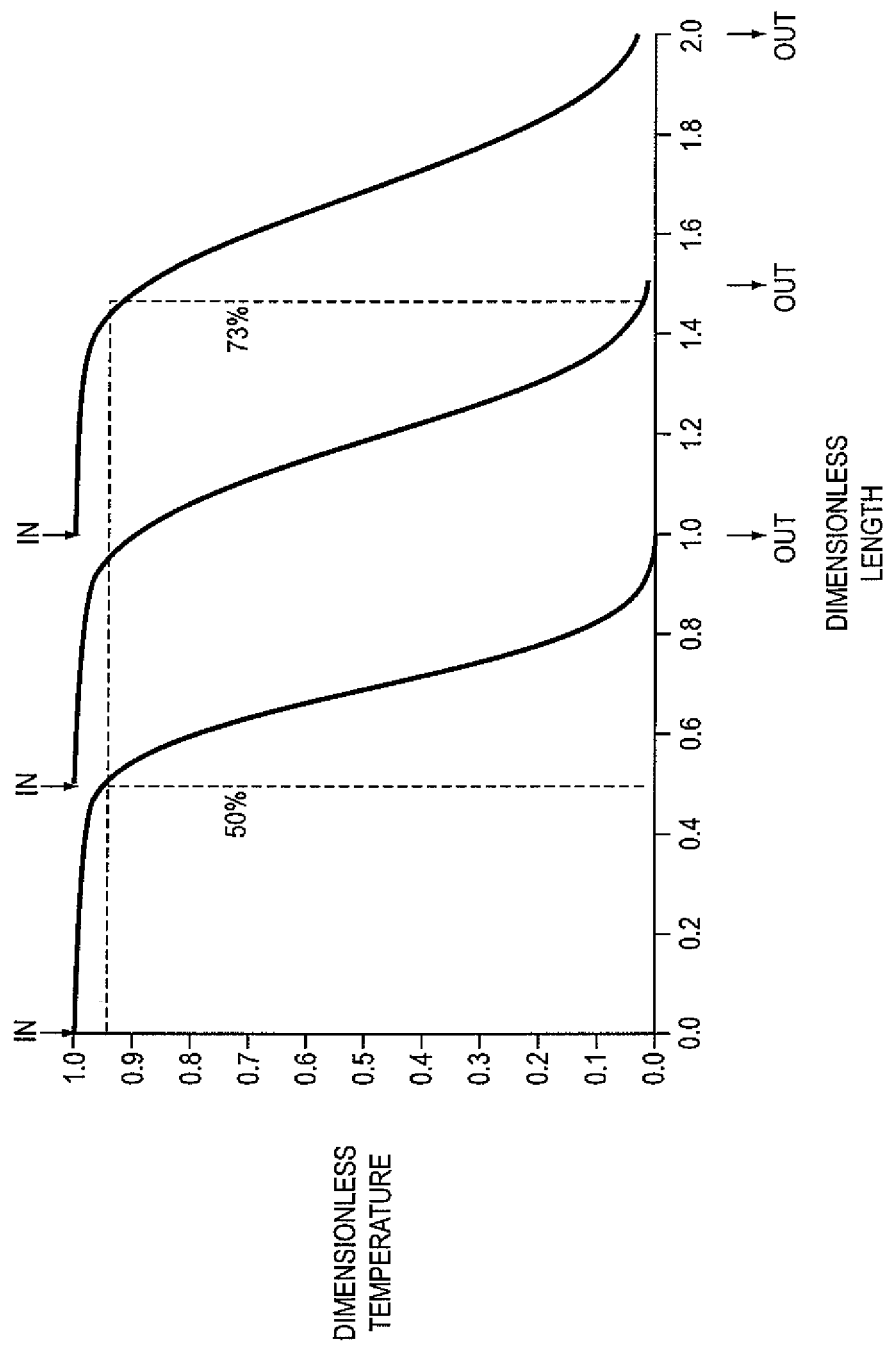
FIG. 8 is a graphical schematic representation of the progress of the temperature front in a four packed bed embodiment of these teachings.

FIG. 8 shows the progress of the temperature front in a four packed bed system of these teachings, such as the system shown in FIGS. 7a-7c. In the exemplary embodiment shown in FIG. 8, the inlet hot gas is at about 1.5 atmospheric pressure, each packed bed is about 15 feet long and the particles in the packed bed are alumina of about 3 mm diameter.

EXEMPLIFICATION

In order to better illustrate the present teachings, and exemplary embodiment is presented hereinbelow. It should be noted that these teachings are not limited only to that exemplary embodiment.

Storage System for 440 MWe CCPP

Figure 10:
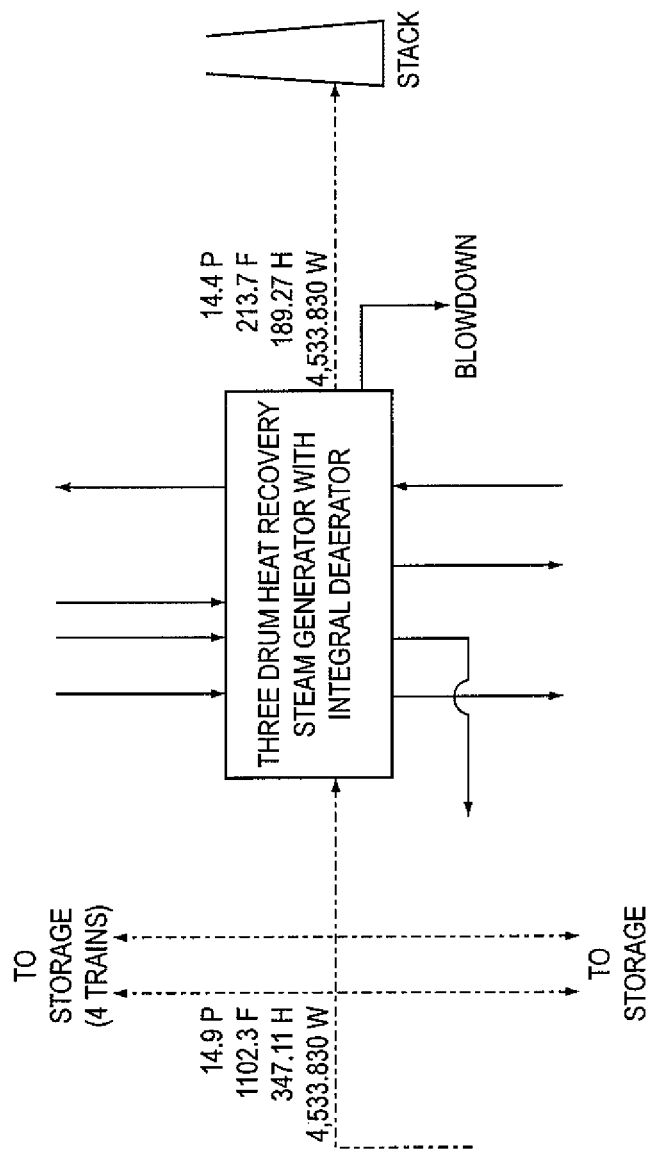
FIG. 10 is a graphical schematic representation of one embodiment of an exemplary system for application of embodiments of these teachings.

The exemplary embodiment relates to a combined cycle power plant with total capacity of 440 MWe, which has steam turbine of capacity 127 MWe. The flow rate of flue gases exiting from the gas turbine is $4.5 \times 10^6$ lbs/hr at absolute pressure of 14.9 psi. These flue gases which are normally fed to HRSG (Heat Recovery Steam Generator) are diverted to storage via four paths (also referred to as trains) as shown in FIG. 10.

Figure 11:
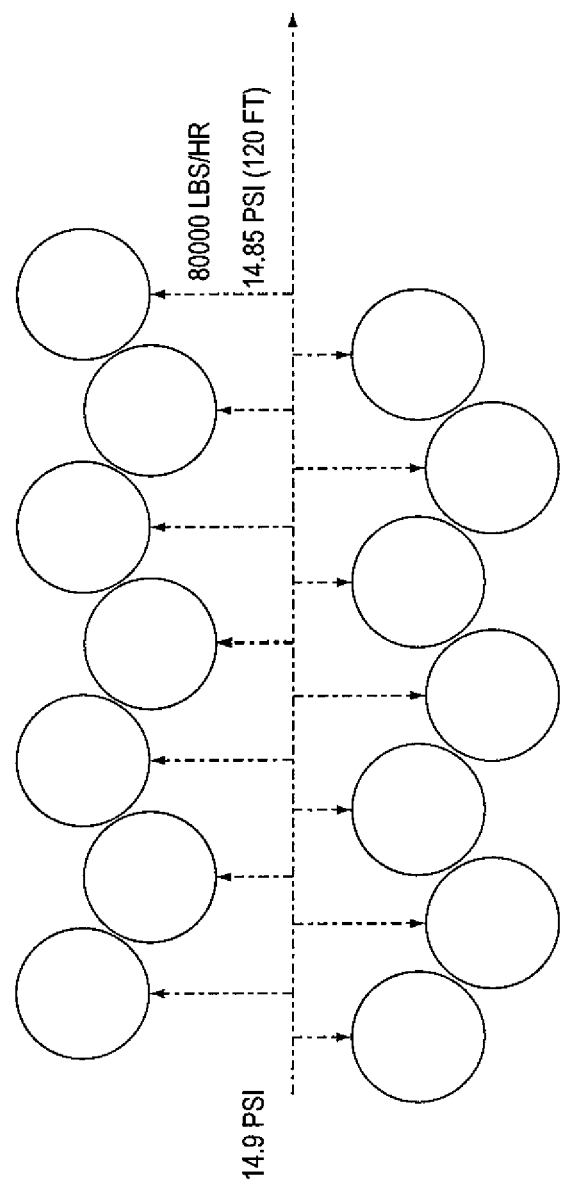
FIG. 11 is a graphical schematic representation of one path (train) and storage vessels supplied by the train in one embodiment of these teachings.

Each train with 7 ft. nominal diameter pipe branches out from the main header which connects gas turbine exit to HRSG. Each train has the capacity to flow $1.15 \times 10^6$ lbs/hr and connects to 14 storage vessels. The pressure drop incurred is minimal due to large, 7 ft diameter pipe leading to storage vessels. The division into 14 vessels results in flow rate of 80000 lbs/hr into each vessel (FIG. 11). The diameter of each vessel is 15 ft which makes the velocity of flue gas entering bed as 2 ft/sec.

Each vessel is divided into 6 segments which are equipped with individual feed and exit points. All the piping connecting to individual vessel or segments is 3 ft diameter. Height of each segment is 5 ft and segments are arranged vertically with feed and exit arrangement indicated in the figure. The segments are made of concrete with insulation bricks inside. The particles filling the segments are 8 mm diameter alumina. At each time only two segments are connected and are part of the flow path. This results in only 10 ft high packed bed causing resistance to the flow at each time, however the bed/vessel total height is 6×5 ft=30 ft for the storage or heat transfer point of view.

Figure 12:
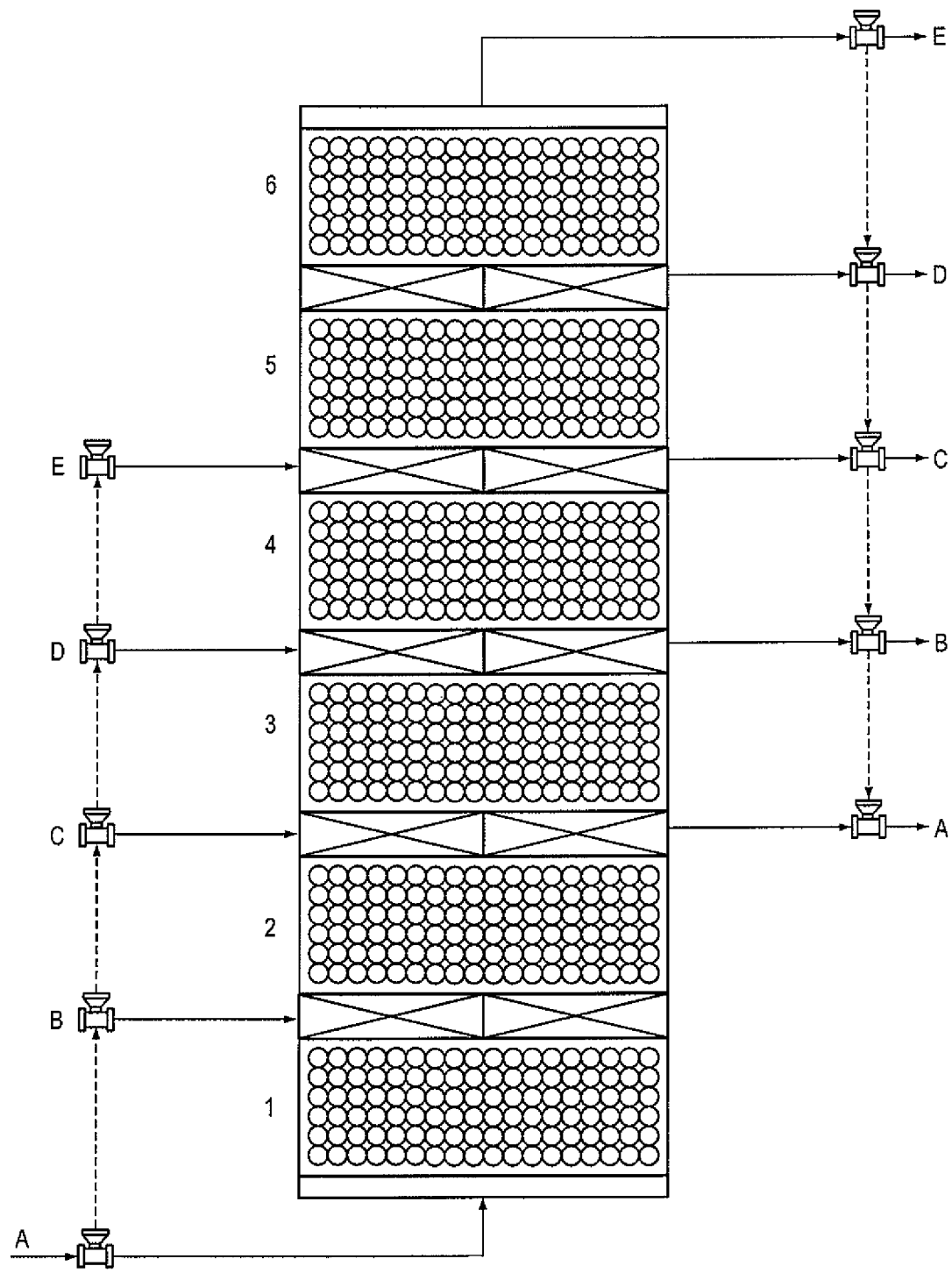
FIG. 12 is a graphical schematic representation of one storage vessel embodiment of these teachings.

A storage vessel with 6 segments and flow arrangement between segments is shown in FIG. 12. The flow path changeover from A to B to C to D to E in that order is actuated based upon outlet temperature of the exit temperature of A, B, C, D and E. If the exit temperature of the gas starts to rise above the initial temperature, flow path is shifted to next one. This flow path changeover involves on/off feedback from temperature sensors (thermocouples) to final control elements (gas dampers at the feed).

Table 1 below shows data for each path (train).

TABLE 1

| Tabulated data for each train | |
|---|---|
| Flow rate (lbs/hr) | 1100000 |
| Length (ft) | 5 ft × 6 |
| Diameter (ft) | 15 ft |
| No. of Vessels | 14 |
| Utilization factor | 0.81 |
| Velocity (ft/sec) | 2 |
| Pressure drop packed bed (psi) | 0.325 |
| Pressure drop, piping | 0.166 |

Total energy stored considering 4 trains=872 MWh(e)

In the heat recovery process, ambient air is pushed through these storage vessels in four trains and hot air recovered is sent to HRSG to generate steam. Fan or blowers are used to provide air substantial pressure to flow through these beds. Each vessel would require blower/fan of the capacity 70 HP.

While the embodiments disclosed herein above are described in terms of the storage mode of operation of the combined cycle power system, the methods and systems of these teachings can also be utilized in the recovery mode of operation, as disclosed in WIPO PCT Patent Application Number PCT/US12/20743, entitled "THERMAL ENERGY STORAGE FOR COMBINED CYCLE POWER PLANTS," filed concurrently with the present application, and claiming priority of U.S. Provisional Patent Application No. 61/481,312, filed on May 2, 2011.

In another group of embodiments of the method and system of these teachings, the packed beds constitute an absorption/adsorption system and the sensor senses concentration of a solute. The control subsystem is the same as that used in the embodiment in which the packed beds constitute a thermal storage system. The concentration sensor can be any conventional concentrations, for example, but not limited, the sensor disclosed in Wu, Yi Ting Huang, Xu Guang Su, Hui, A quasidistributed fiber optic sensor for solute concentration measurement based on Fresnel reflection, Applied Physics Letters, Vol. 91, Issue 13, pp. 131101-131103 (September 2007) or the sensor disclosed in Chang-Bong Kim and C. B. Su, "A Fiber Optic Sensor for Measurements of Solute Concentration in Fluids," J. Opt. Soc. Korea 7, 102-105 (2003).

Figure 9:
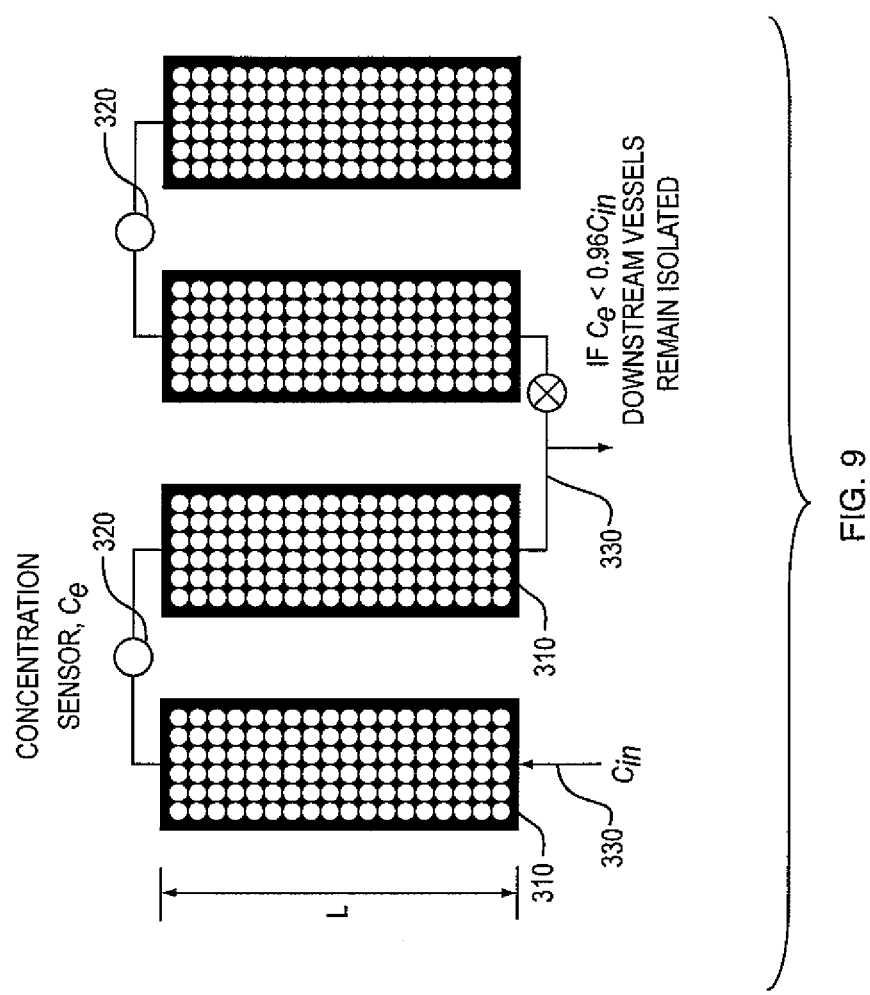
FIG. 9 is a schematic representation of an embodiment of an absorption/adsorption system of these teachings.

An embodiment of the system of these teachings in which the packed beds constitute an absorption/adsorption system is shown in FIG. 9. Referring to FIG. 9, in the embodiment shown therein, four packed beds 310 are connected in series and a sensor 320 (a concentration sensor in the embodiment shown therein) disposed between each consecutive one of the packed beds 310. A flow connection component 330 (such as, for example, one or more valves) is disposed between each two consecutive packed beds 310. In FIG. 9, one flow collection component 330 enables fluid input into the first packed bed and another flow connection component 330 enables fluid exit from the second packed bed. A control subsystem (205, FIG. 3a or FIG. 3b) is operatively connected to each sensor 320 and to each flow connection/control component 330. The control subsystem 205, if the output of the sensor disposed between an input packed bed and a next packed bed exceeds a predetermined sensor output, provides a signal to several flow connection components 330 and causes transfer of injection of fluid from the input packed bed to a next packed bed in the flow path, referred to as a successor packed bed, and the exit of fluid from an output packed bed to a packed bed succeeding the output packed bed and next to the output packed bed, referred to as a follower packed bed. The successor packed bed becomes the input packed bed and the follower packed bed becomes the output packed bed. In one instance, a portion of the control subsystem 205 is located in proximity to and operatively connected to each sensor 320. In another instance, the control subsystem 205 is centralized and receives signals from each sensor 320. In one instance, shown in FIG. 9, the predetermined sensor output is about 96% of concentration of solute in the fluid injected into the input packed bed.

Although the system and method of these teachings has been described in terms of two embodiments, these teachings are not limited only to only those two embodiments. Other embodiments are within the scope of these teachings.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized these teachings are also capable of a wide variety of further and other embodiments within the spirit and scope of the appended claims.

What is claimed is:

1. A method for optimizing utilization of packed beds in a heat/mass transfer operation, the method comprising the steps of:
   (a) initially injecting fluid, the fluid being the fluid used in a heat/mass transfer operation, into an input end of a first packed bed from a first number of packed beds; said first packed bed being an input packed bed; a sensor being disposed between each consecutive one of the packed beds from the first number of packed beds; exit of the fluid from the first number of packed beds being enabled a second number of packed beds away from and along a flow path including the input packed bed; a packed bed the second number of packed beds away from the input packed bed, being an output packed bed; the second number of packed beds being a subset of the first number of packed beds;
   (b) sensing, utilizing the sensor between the input packed bed and a consecutive packed bed, a quantity representative of the heat/mass transfer operation; the fluid flowing from an output end of the input packed bed to an input end of the consecutive packed bed; the sensor being disposed between the output end of the input packed bed and the input end of the consecutive packed bed;
   (c) transferring, if output of the sensor disposed between the input packed bed and the consecutive packed bed in the flow path exceeds a predetermined sensor output, injection of fluid from the input packed bed to the consecutive packed bed in the flow path, referred to as a successor packed bed, and the exit of fluid from the output packed bed to a packed bed succeeding the output packed bed and next to the output packed bed, referred to as a follower packed bed; the input packed bed being connected in series with the successor packed bed; wherein the follower packed bed was not previously in the flow path; the successor packed bed becoming the input packed bed and the follower packed bed becoming the output packed bed; and (d) repeating steps (b) and (c) until the output packed bed is a last packed bed from the first number of packed beds.

2. The method of claim 1 wherein the second number of packed beds is one; whereby a number of packed beds in the flow path is two.

3. The method of claim 1 wherein the first number of packed beds constitutes a thermal storage system and wherein the sensor senses temperature.

4. The method of claim 3 wherein each packed bed comprises high thermal conductivity heat resistance particles; said particles being in contact with each other and defining voids between said particles in order to facilitate flow of the fluid in a predetermined direction; said predetermined flow direction constituting a longitudinal direction; dimensions of said particles and of said each packed bed being selected such that a resultant back pressure is at most a predetermined back pressure.

5. The method of claim 4 wherein the dimensions of said particles are selected such that Biot number magnitude does not exceed 0.1.

6. The method of claim 5 wherein said particles comprise alumina and wherein a characteristic dimension of said particles is between about 6 mm to about 8 mm.

7. The method of claim 4 wherein said particles comprise at least one of alumina, graphite, silica, quartz, or ceramic.

8. The method of claim 4 wherein said a ratio of a characteristic dimension of said packed bed in a longitudinal direction to a characteristic dimension of said packed bed in a direction transverse to the longitudinal direction is at most 2.15.

9. The method of claim 3 wherein the predetermined sensor output is about 96% of temperature of fluid injected into the input packed bed.

10. The method of claim 3 wherein the second number of packed beds is one; whereby a number of packed beds in the flow path is two.

11. The method of claim 1 wherein the first number of packed beds constitutes an absorption/adsorption system and wherein the sensor senses concentration of a solute.

12. The method of claim 11 wherein the predetermined sensor output is about 96% of concentration of the solute in fluid injected into the input packed bed.

13. The method of claim 11 wherein the second number of packed beds is one; whereby a number of packed beds in the flow path is two.

14. A system for optimizing utilization of packed beds in heat/mass transfer operation, the system comprising:
   a first number of packed beds;
   a number of flow connection/control components; one flow connection/control component from the number of flow connection/control components disposed between two consecutive packed beds from the first number of packed beds such that, when flow occurs, each packed bed from the first number of packed beds in a flow path is connected in series to a successive packed bed in the flow path; fluid flowing from an output end of said each packed bed to an input end of the successive packed bed;
   a number of sensors; each sensor from the number of sensors connected in series between one packed bed from the first number of packed beds and a successive packed bed; the sensor being disposed between an output end of the one packed bed and the input end of the successive packed bed; and a control subsystem transferring, if output of the sensor disposed between an input packed bed and a next packed bed exceeds a predetermined sensor output, injection of fluid from the input packed bed to a next packed bed in the flow path, referred to as a successor packed bed, and the exit of the fluid from an output packed bed to a packed bed succeeding the output packed bed and next to the output packed bed, referred to as a follower packed bed; wherein the follower packed bed was not previously in the flow path; the input packed bed being connected in series with the successor packed bed; the successor packed bed becoming the input packed bed and the follower packed bed becoming the output packed bed; said control subsystem being operatively connected to the number of sensors and to the number of flow connection/control components; the number of flow connection/control components enabling initially injecting fluid, the fluid being the fluid used in a heat/mass transfer operation, into a first packed bed from the first number of packed beds, said first packed bed being the input packed bed, and exit of the fluid from a packed bed a second number of packed beds away from and along a flow path including the input packed bed; the second number of packed beds being a subset of the first number of packed beds; a packed bed the second number of packed beds away from the input packed bed being the output packed bed.

15. The system of claim 14 wherein the first number of packed beds constitutes a thermal storage system and wherein each sensor from the number of sensors senses temperature.

16. The system of claim 15 wherein each packed bed comprises high thermal conductivity heat resistance particles; said particles being in contact with each other and defining voids between said particles in order to facilitate flow of the fluid in a predetermined direction; said predetermined flow direction constituting a longitudinal direction; dimensions of said particles and of said each packed bed being selected such that a resultant back pressure is at most a predetermined back pressure.

17. The system of claim 16 wherein the dimensions of said particles are selected such that Biot number magnitude does not exceed 0.1.

18. The system of claim 17 wherein said particles comprise alumina and wherein a characteristic dimension of said particles is between about 6 mm to about 8 mm.

19. The system of claim 15 wherein said particles comprise at least one of alumina, graphite, silica, quartz, or ceramic.

20. The system of claim 15 wherein said a ratio of a characteristic dimension of said packed bed in a longitudinal direction to a characteristic dimension of said packed bed in a direction transverse to the longitudinal direction is at most 2.15.

21. The system of claim 15 wherein said storage medium further includes heat storage material and heat insulating material, further including periodic insulating porous layers of said heat insulating material in said flow path.

22. The system of claim 21 wherein the insulating layer is a plate with passages, said plate made of an insulating heat resistant material.

23. The system of claim 21 wherein said insulating layer is a layer of insulating heat resistant particles similar in size to the heat conducting material.

24. The system of claim 15 wherein the predetermined sensor output is about 96% of temperature of fluid injected into the input packed bed.

25. The system of claim 15 wherein the second number of packed beds is one; whereby a number of packed beds in the flow path is two.

26. The system of claim 14 wherein the first number of packed beds constitute an absorption/adsorption system and wherein each sensor from the number of sensors senses concentration of a solute.

27. The system of claim 26 wherein the predetermined sensor output is about 96% of concentration of the solute in fluid injected into the input packed bed.

28. The system of claim 26 wherein the second number of packed beds is one; whereby a number of packed beds in the flow path is two.

29. The system of claim 14 wherein the control subsystem comprises signal actuation components; said signal actuation components being operatively connected to sensors from the number of sensors and to flow connection/control components from the number of flow connection/control components.

30. The system of claim 29 wherein the signal actuation component comprises digital signal actuation components.

31. The system of claim 14 wherein the control subsystem comprises:

one or more processors; and one or more computer usable media having computer readable code embodied therein, the computer readable code causing the one or more processors to:

transfer, if output of the sensor disposed between an input packed bed and a next packed bed exceeds a predetermined sensor output, injection of fluid from the input packed bed to a next packed bed in the flow path, referred to as a successor packed bed, and the exit of fluid from an output packed bed to a packed bed succeeding the output packed bed and next to the output packed bed, referred to as a follower packed bed; wherein the follower packed bed was not previously in the flow path.

32. The system of claim 31 wherein one processor and computer usable media is located in proximity to and operatively connected to each sensor.

33. The system of claim 14 wherein the control subsystem comprises a number of digital circuits having logic components that cause transferring, if output of the sensor disposed between an input packed bed and a next packed bed exceeds a predetermined sensor output, injection of fluid from the input packed bed to a next packed bed in the flow path, referred to as a successor packed bed, and the exit of fluid from an output packed bed to a packed bed succeeding the output packed bed and next to the output packed bed, referred to as a follower packed bed; wherein the follower packed bed was not previously in the flow path.

34. The system of claim 33 wherein one digital circuit is located in proximity to and operatively connected to each sensor.

* * * * *